US005847718A

United States Patent [19]
Watson

[11] Patent Number: 5,847,718
[45] Date of Patent: Dec. 8, 1998

[54] IMAGE PROCESSING SYSTEM FOR DISPLAYING OF LARGE IMAGES IN AN EFFICIENT MANNER

[75] Inventor: David Watson, West Wellow, United Kingdom

[73] Assignee: International Business Machines Corporation, Armonk, N.Y.

[21] Appl. No.: 760,528

[22] Filed: Dec. 2, 1996

[30] Foreign Application Priority Data

Nov. 29, 1995 [GB] United Kingdom .................... 9524425

[51] Int. Cl.$^6$ .................................................. G06F 15/167
[52] U.S. Cl. .......................... 345/512; 345/162; 345/502; 345/511
[58] Field of Search ..................................... 345/502, 507, 345/512, 509, 508, 511, 160, 157, 162, 514

[56] References Cited

U.S. PATENT DOCUMENTS 4,119,953  10/1978  Yeschick ................................. 345/162
4,977,518  12/1990  Bonnet et al. .......................... 345/162

Primary Examiner—Kee M. Tung
Attorney, Agent, or Firm—Ronald L. Drumheller

[57] ABSTRACT

An image processing system is connected to a display device for displaying an image comprising a plurality of frames. The system comprises first and second processors, input controller for receiving positional information from a user via an input device connectable to the image processing system, and a shared memory accessible by the first and second processors for storing data representing frames of an image, and the positional information. The first processor is arranged to load frames of the image from a storage device in to the shared memory, for each frame the first processor being arranged to retrieve from the storage device data representing that frame, to load the frame data into the shared memory, and to store in the shared memory frame address information identifying the location within shared memory of the frame data and the positional relationship of the frame to other frames of the image. Further, the first processor accesses the positional information to determine in what order to load the frames of the image in to shared memory. In parallel, the second processor is arranged to access the positional information to determine a portion of the image to be displayed, and with reference to the frame address information, to retrieve the corresponding image data from the shared memory for display of that portion on the display device. By this approach, the system enables image data to be loaded and displayed to a user in a manner which meets the performance requirements of the user, but which does not require the use of complex and expensive hardware as employed in prior art systems.

14 Claims, 3 Drawing Sheets

IMAGE PROCESSING SYSTEM FOR DISPLAYING OF LARGE IMAGES IN AN EFFICIENT MANNER

BACKGROUND OF THE INVENTION

1. Field of the Invention

The present invention relates to the subject of image processing, and in particular to the displaying of large images in an efficient manner.

2. Related Art

In many applications involving large images, the volume of data to be handled is many times the capacity of the machines being used. Take for example an image collected from a camera mounted under an aircraft and stored as a group of digital image frames. Assuming that computer based processing of the image is then required, a quick and efficient technique is needed to access various parts of the image. Displaying a portion of the image on a screen, and then scrolling through the image using an input device such as a mouse would be an easy, user-friendly way of achieving this. However, when a user wishes to view the group of images and scroll both forwards and backwards through the group on a computer workstation, it is generally found that the amount of data to be handled is so large that the system cannot load in image data quick enough to keep up with the scrolling input entered by the user. This manifests itself as a performance problem, the user having to wait for new data to be loaded before being able to continue scrolling through the image.

In the past this problem has been alleviated by the provision of special purpose hardware designed specifically to handle the loading of large image datasets at high speed. However, this hardware is complex, expensive, and generally non-portable since it is designed for particular data types, software platforms, hardware platforms, etc. An example of such a piece of hardware is the MaxVideo 250 available from Datacube Inc, which is a multipurpose adapter card for image acquisition, process, store and display. The adapter is built for the VME bus architecture, which makes it non-portable to other bus architectures. Given the drawbacks of such prior art, it would hence be desirable to provide a solution to the performance problem which avoided the requirement for such specialist hardware.

SUMMARY OF THE INVENTION

Accordingly the present invention provides an image processing system connectable to a display device for displaying an image comprising a plurality of frames, the system comprising: first and second processors; input means for receiving positional information from a user via an input device connectable to the image processing system; and a shared memory accessible by the first and second processors for storing data representing frames of the image, and the positional information; said first processor being arranged to load frames of the image from a storage device in to the shared memory, for each frame the first processor being arranged to retrieve from the storage device data representing that frame, to load the frame data into the shared memory, and to store in the shared memory frame address information identifying the location within shared memory of the frame data and the positional relationship of the frame to other frames of the image; said first processor being arranged to access the positional information to determine in what order to load the frames of the image in to shared memory; said second processor being arranged to access the positional information to determine a portion of the image to be displayed, and with reference to the frame address information, to retrieve the corresponding image data from the shared memory for display of that portion on the display device.

The solution proposed by the present invention involves the use of systems having at least two processors, and some memory that is shared between those processors, such systems being available from IBM Corporation, SUN Microsystems, Inc., Silicon Graphics, Inc., etc. The simplest system that could be used would have two processors, but more processors could be used to further improve performance. For instance, a number of processors can be arranged to load frames of the image in to the shared memory.

In preferred embodiments, the positional information stored in the shared memory includes directional information for determining which direction the user wishes to move through the image. Although the directional information may be stored as such, in preferred embodiments it will be inherently stored through the storage of a history of positional information. From the position history, the directional information can be readily determined by a processor. Then, for example, this directional information can be used by the first processor to determine in what order to load the frames of the image in to shared memory.

Since the shared memory will typically not be large enough to store all the frames of the image, in preferred embodiments memory management means is provided for applying predetermined criteria to select frames which can be discarded from the shared memory so as to ensure that space is available in the shared memory for frames subsequently loaded by the first processor. Preferably, the memory management means is arranged to use the positional information stored in the shared memory to select discardable frames that are farthest spatially from the current user position.

Viewed from a second aspect, the present invention provides a method of operating an image processing system to display an image comprising a plurality of frames, the image processing system having first and second processors, and a shared memory accessible by the first and second processors for storing data representing frames of the image, the method comprising the steps of: (a) employing said first processor to load frames of the image from a storage device in to the shared memory, for each frame the loading process comprising the steps of: (i) retrieving from the storage device data representing the frame; (ii) loading the frame data into the shared memory; and (iii) storing in the shared memory frame address information identifying the location within shared memory of the frame data and the positional relationship of the frame to other frames of the image; (b) employing the second processor to display portions of the image on a display device; and (c) storing in the shared memory positional information entered by a user via an input device connectable to the image processing system; at step (a), said first processor accessing the positional information to determine in what order to load the frames of the image in to shared memory; and at step (b) said second processor accessing the positional information to determine a portion of the image to be displayed, and referencing the frame address information in order to retrieve the corresponding image data from the shared memory for display of that portion on the display device.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

For the purposes of the preferred embodiment, we shall assume that an image of interest is stored as a group of image frames in a disc storage system accessible by the image processing system. Clearly any appropriate storage system can be used, and indeed the access to the storage system may be achieved in any suitable manner, eg local access, access via LAN, WAN, etc.

Typically the image may extend over a large area, and in such cases the frames may be thought of as tiles which, when placed in appropriate positions with respect to each other, will reproduce the complete image. Alternatively, the image may be a long narrow strip such as that produced by passing a camera in a straight line over an object of interest. In such cases, the image frames need to be positioned sequentially one after the other in order to reproduce the original image.

In order to present the frames of the image on a display device, they must first be loaded into a memory area and then displayed by hardware to a display device (for example a computer screen, projection display etc.). However, as already mentioned earlier, when the image is large, and there are hence many frames to be loaded, the internal memory of the system will generally not be large enough to retain image data for all of the frames making up the image. In such cases, frames need to be loaded whilst the user is viewing other portions of the image. It is often the case that, unless specialist hardware is employed, data cannot be loaded quickly enough to ensure that the portion of the image the user desires to view is always available for viewing at the time the user requests it.

In preferred embodiments of the invention, a technique is provided which greatly enhances the speed of display in situations such as those described above, and which can be implemented on a standard workstation that includes at least two processors, and has memory which can be shared by those processors. This approach avoids the need for the complex and expensive specialist hardware that was required in prior art systems.

At the current time, there are a number of standard workstations available which use multiprocessors and provide a shared memory environment. For example, so-called symmetrical shared memory workstations such as the RISC System/6000 G30 available from IBM Corporation, the SPARCcenter available from Sun Microsystems, Inc., and the POWER Challenge available from Silicon Graphics, Inc., are suitable standard workstations upon which the preferred embodiment of the present invention can be implemented.

Figure 1:
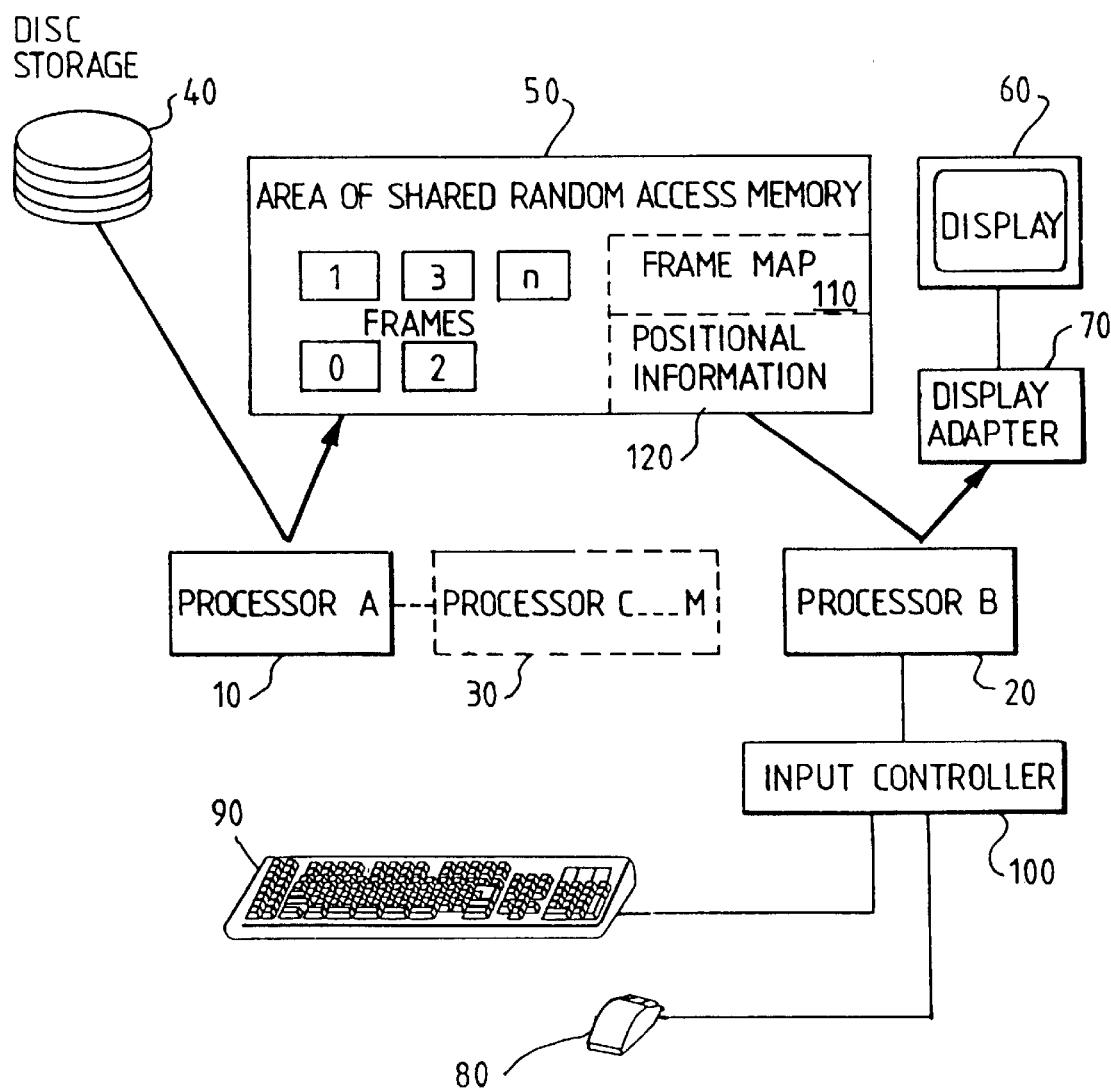
FIG. 1 is a block diagram of an image processing system in accordance with the preferred embodiment of the present invention.

FIG. 1 provides a schematic block diagram of a system in accordance with the preferred embodiment of the present invention. In FIG. 1, two processors 10, 20 are shown, namely processor A and processor B. Processor B 20 is arranged to execute the code to allow the user to specify the image to be viewed, and also the viewing/scrolling code. As will be appreciated by the person skilled in the art, there are many examples of this type of code available today, and so such software will not be described in any detail herein.

When an image is requested by the user, processor B 20 starts up a process on processor A 10. Processor A is arranged to be used purely for loading data as required from disc storage 40 into shared memory 50, this shared memory being accessible by both the loading processor A 10 and the display processor B 20. As illustrated in FIG. 1, if more processors C . . . M 30 are available, these can be arranged to work together with Processor A 10 to increase the speed at which image frames are loaded in to shared memory 50.

When the processor B 20 initiates the loading process on processor A 10, processor A 10 reads in data representing a frame of the image from the disk 40 and stores it in the shared memory 50. Further, since the system must keep track of which frames of the image are currently in storage, suitable information is stored in an area 110 of shared memory 50 such that both the loading and display processors can access the information. The particular part of shared memory reserved for this information shall be referred to hereafter as a frame map 110. The data stored in the frame map identifies the memory location at which each particular loaded frame has been stored, and also the position in spatial terms of that frame within the whole group of frames constituting the image.

It will be apparent that the frame map may be implemented in a number of ways. As an example, the portion of memory constituting the frame map may be logically arranged to represent the area of the image, a location in this portion of memory being set aside for each frame within the image. The logical relationship between the locations is such that it represents the real spatial relationship between the various frames of the image. The data at each location is originally set to zero, indicating that the frame represented by that location has not been loaded. As the frame data for each frame is loaded, the address of the frame data in shared memory is stored at the corresponding location in the frame map 110.

The actual frame which is loaded first by processor A 10 may have been specified by the user, or alternatively a default frame such as that which represents the centre of the image may be loaded. In preferred embodiments, the amount of image data initially loaded by the process on processor A should be large enough to permit some initial scrolling of the image by the user. Hence, it may be appropriate for processor A to load in several frames before informing processor B that the image can be displayed to the user.

After processor A has completed the initial loading process discussed above, processor A 10 passes to processor B 20 the shared memory address of the frame map, plus an index to a specific location of the frame map in which the processor B 20 will find the address information for the first frame to be displayed by the viewing process on processor B 20. Processor B 20 then retrieves the frame data from shared memory 50, determines a suitable portion of that frame to be displayed on the display device 60, and then employs the display adapter 70 to display that portion of the frame on the display device 60. It may be that the frame size corresponds to the size of the screen, in which case the whole frame can be displayed by processor B. Alternatively the frame may be larger than the screen size, in which case only a portion of the frame would be displayed. If, conversely, the frame size was smaller than the screen size, then processor B would access several frames in the shared memory 50 in order to construct a portion of the image for display. As will be appreciated by those skilled in the art, there are several known techniques for reading frame data from memory and producing an image for display, and so these techniques will not be discussed further herein.

Once a portion of the image has been displayed, the user may wish to move to different parts of the image. Interaction between the user and the system may be provided by any suitable input device, such as a mouse 80 or keyboard 90. Signals from these input devices are received by an input controller 100 and passed to a processor for handling. In the preferred embodiment, the signals are passed to the processor B 20, but it will be apparent that any available processor could be used. These input signals will in preferred embodiments define the position of a cursor on the display screen, and can be used to produce information as to the direction in which the user wishes the display of images to proceed. In preferred embodiments, processor B 20 stores the positional information entered by the user in a portion 120 of the shared memory 50. For example, if the input device is a mouse 80, then processor B would store the current position of the mouse pointer.

Whilst the user is interacting with the image on Processor B 20, the loading process on processor A 10 continues to load data into shared memory. Processor A is preferably arranged to access the positional information 120 stored by processor B 20 in shared memory, since this information can be used by the processor A (and indeed any other loading processors 30) to determine which frames should next be loaded from storage. In preferred embodiments, the positional information will define the position of a mouse cursor, and may include a history of mouse cursor positions, or alternatively just the current mouse cursor position. It will be appreciated that such positional information can be used in a number of ways. For example, if a history of cursor positions is stored, processor A could use that history to identify a direction in which the user is likely to move through the image. Based on this directional information, processor A could then exercise a look ahead loading scheme whereby frames which fall along the projected line of direction of movement of the mouse cursor are loaded, starting with the frames which are closest to the current cursor position, in anticipation of the current position moving to a point in those frames. Alternatively, the directional information could be given less weight, and the processor A could proceed to load all frames which lie adjacent to the frame(s) currently being displayed. Once these are loaded, it could then continue to load in the frames based on their proximity to the current cursor position.

It will be appreciated by those skilled in the art that other ways of using the positional information can be chosen, either out of personal choice or because the positional information is of a different form and thus requires a different approach. For example, if the positional information represented a new location in the image to which the user wished to move, for instance a set of coordinates entered by the user via a keyboard 90, then this information could still be used by processor A to determine in what order to load frames of the image in to shared memory 50. If the new coordinates represented a position farther than some threshold from the currently displayed portion of the image, then processor A could be arranged to load the frame containing those new coordinates next. If the threshold was not exceeded, processor A could be arranged to identify a path between the currently displayed portion of the image and the new coordinates, and to load the frames falling along that path, starting with the frame closest to the currently displayed portion (which may well already be loaded in to shared memory 50). This latter approach will enable the viewing processor B 20 to display portions of the image between the currently displayed portion and the new coordinates, thus presenting to the user a smooth movement to the new location.

The positional information stored in shared memory can also be used to manage memory full conditions as will be discussed in more detail later.

Figure 2:
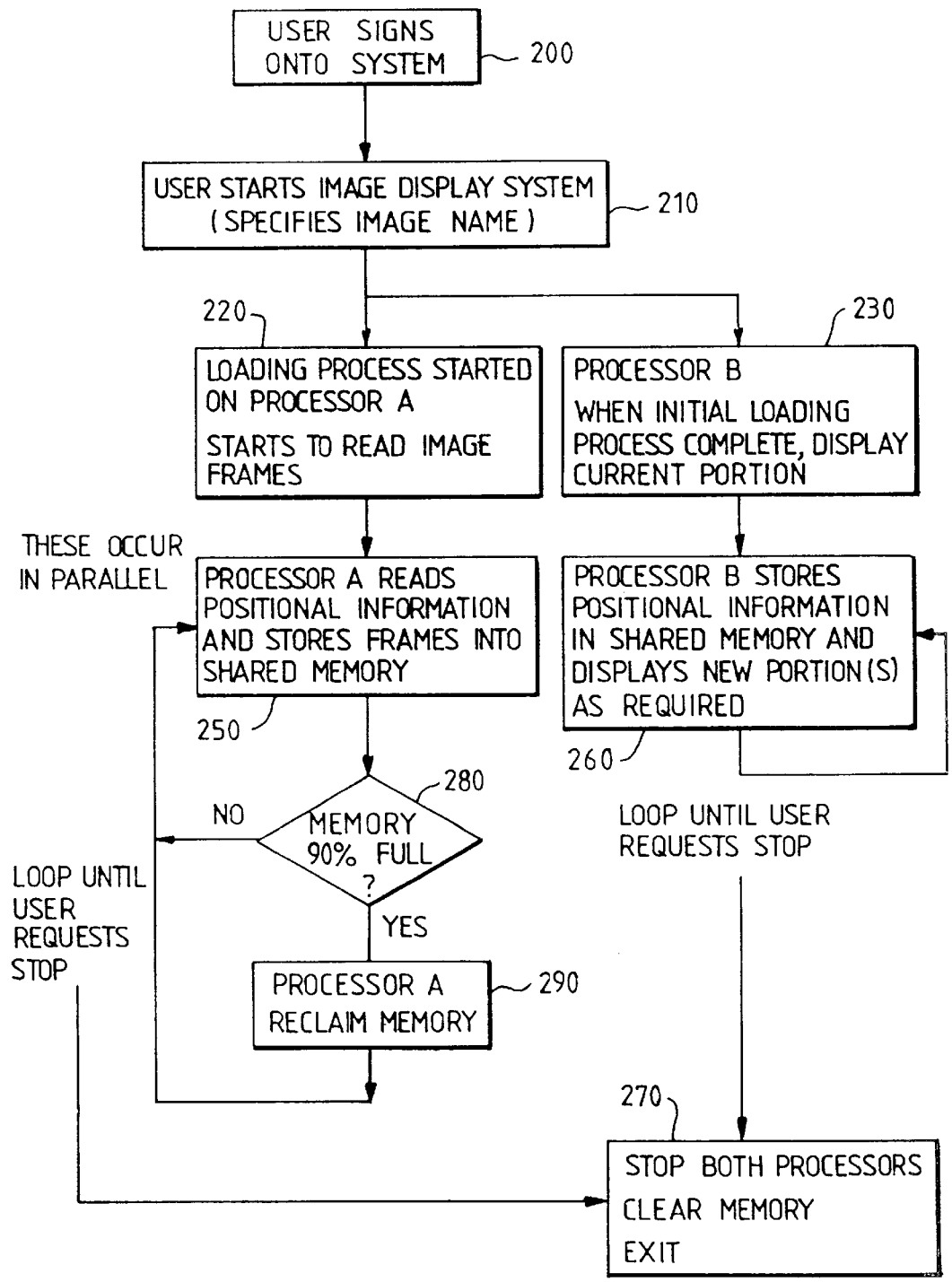
FIG. 2 is a flow diagram illustrating the operation of the system shown in FIG. 1.

Having discussed the system of the preferred embodiment, the operation of that system will now be discussed in more detail with reference to the flow diagram of FIG. 2. At step 200, a user signs on to system, and at step 210 starts the image display system. As part of this process, the user supplies, or is prompted to supply, an image name. At step 220, the loading process is then started on Processor A, and processor B provides processor A with the image name supplied by the user. Typically, when the loading process requests access to the image, the operating system resolves the name to a disk address.

Processor A then starts to read image frames from disk storage 40 to shared memory 50, storing information in the frame map 110 as it does so. As already discussed, several frames may be loaded during the initial loading process. The initial loading process is deemed lo be complete when sufficient frame data is stored in shared memory 50 to allow a first image portion to be displayed, whilst still leaving enough data in shared memory to allow some initial scrolling by the user. Once the initial loading process is complete, processor A informs processor B, passing it the shared memory address of the frame map, and an index to a location in the frame map giving address information of the first frame to be displayed.

Then, at step 230, processor B displays to the user a portion of the image. From this point, two processes are operating in parallel. At step 260, processor B stores in shared memory 50 positional information 120 entered by the user, and displays new portions of the image that are required as a result of such user movement. When the viewing process is nearing an image frame boundary, processor B must ensure that the relevant pointers are updated to enable a smooth transition across the frame boundary. The address of adjacent frames can be accessed by Processor B via the frame map. It will be appreciated by those skilled in the art that there are several known techniques for managing transitions across frame boundaries, and hence this issue need not be discussed further herein.

In parallel with the viewing process 260, Processor A, at step 250, is continuing to load in further frames of the image. As mentioned earlier, the positional information 120 is used in this process to determine the order in which to load the image frames. As indicated in FIG. 2, these processes loop until the user requests that the display process be stopped. At this point, both steps 250 and 260 proceed to step 270, where both processes stop, and memory is cleared. At this point, the image display process is exited.

It will be apparent to those skilled in the art that, at some point, the fast and relentless frame loading process occurring at step 250 will cause the shared memory to become full in many foreseeable situations. This would have adverse effects on the user's ability to continue to browse through the image, since new frames could no longer be loaded by processor A. To avoid this a memory management facility is employed to identify frames which can be discarded from shared memory before shared memory becomes full, thereby ensuring that there is always space for new frames to be loaded in to memory. Such identified frames can then be positively erased, or merely overwritten by subsequently loaded frame data.

It will be appreciated that there are many techniques available for managing memory in this way. A simple scheme would be a "longest time since visited" scheme, whereby frames which have been in memory for the longest, and have not been used, would be discarded to free up memory space. However, this is not considered the best solution in this case. For reasons which will be discussed below with reference to FIG. 3, the solution used in the preferred embodiment is to free off those frames which are farthest from the current viewing point. The positional information 120 and frame map 10 already in shared memory can be used for this purpose, since they provide details of the current user position and the spatial relationship between all the image frames stored in shared memory.

Figure 3:
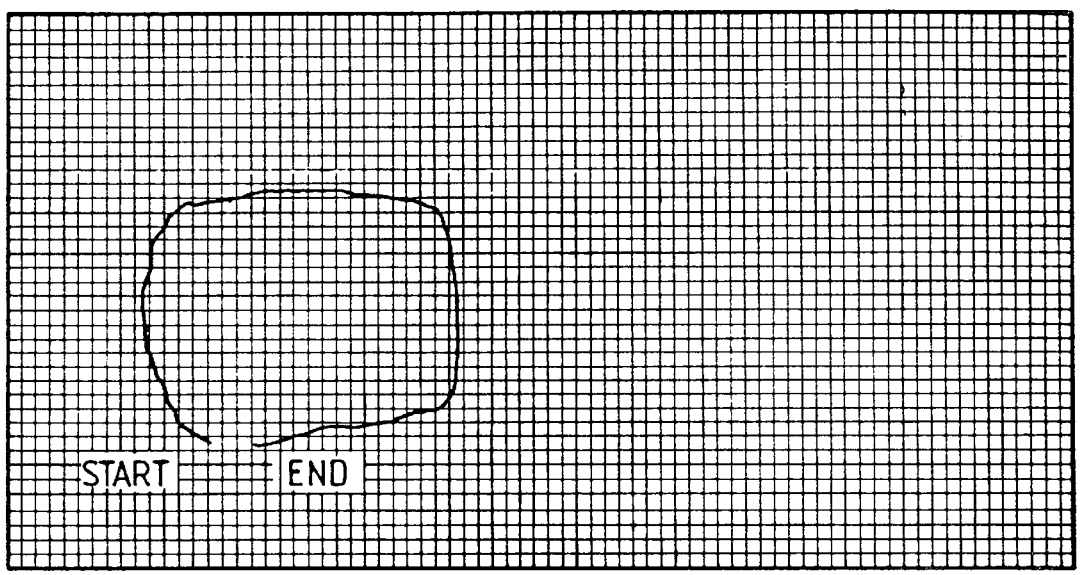
FIG. 3 is a diagram illustrating a possible viewing path through a large image that may be taken by a user of the system of the preferred embodiment.

The reason that this scheme is preferable can be illustrated with reference to FIG. 3, which shows a loop-shaped path taken by a user through an image. The squares in FIG. 3 represent frames of an image, and the line is the user's path across the image. If the shared memory space was filled by the time the user reached the "End" point then a memory freeing scheme based on the 'length of time since visited' would discard frames beginning at "Start". However, it is likely that a user will move from the "End" point towards the "Start" point making it more efficient to free image frames which are farthest from the current point in the path. It will be apparent that this scheme is also effective for a linear path.

Returning to FIG. 2, the memory management facility is provided by employing steps 280 and 290 in the loop containing the frame loading process 250. At step 280, it is determined how full the memory is and, if a certain threshold is exceeded (in the example 90% full is chosen as the threshold), then the process proceeds to step 290, where the memory management process is invoked to reclaim memory. If the threshold has not been exceeded, the memory management process is not invoked, and the process returns to step 250.

From the above description, it is clear that the system of the preferred embodiment enables image data to be loaded and displayed to a user in a manner which meets the performance requirements of the user, but which does not require the use of complex and expensive hardware as employed in prior art systems.

I claim:

1. An image processing system connectable to a display device for displaying an image comprising a plurality of frames, the system comprising:

first and second processors;

input means for receiving positional information from a user via an input device connectable to the image processing system; and a shared memory accessible by the first and second processors for storing data representing frames of the image, and the positional information;

said first processor being arranged to load frames of the image from a storage device in to the shared memory, for each frame the first processor being arranged to retrieve from the storage device data representing that frame, to load the frame data into the shared memory, and to store in the shared memory frame address information identifying the location within shared memory of the frame data and the positional relationship of the frame to other frames of the image;

said first processor being arranged to access the positional information to determine in what order to load the frames of the image in to shared memory;

said second processor being arranged to access the positional information to determine a portion of the image to be displayed, and with reference to the frame address information, to retrieve the corresponding image data from the shared memory for display of that portion on the display device.

2. An image processing system as claimed in claim 1, wherein the first processor comprises a number of processors arranged to load frames of the image in to the shared memory.

3. An image processing system as claimed in claim 2, further comprising memory management means for applying predetermined criteria to select frames which can be discarded from the shared memory so as to ensure that space is available in the shared memory for frames subsequently loaded by the first processor.

4. An image processing system as claimed in claim 2, wherein the positional information stored in the shared memory includes directional information for determining which direction the user wishes to move through the image.

5. An image processing system as claimed in claim 4, further comprising memory management means for applying predetermined criteria to select frames which can be discarded from the shared memory so as to ensure that space is available in the shared memory for frames subsequently loaded by the first processor.

6. An image processing system as claimed in claim 1, wherein the positional information stored in the shared memory includes directional information for determining which direction the user wishes to move through the image.

7. An image processing system as claimed in claim 1, further comprising memory management means for applying predetermined criteria to select frames which can be discarded from the shared memory so as to ensure that space is available in the shared memory for frames subsequently loaded by the first processor.

8. An image processing system as claimed in claim 7, wherein the memory management means is arranged to use the positional information stored in the shared memory to select discardable frames that are farthest spatially from the current user position.

9. A method of operating an image processing system to display an image comprising a plurality of frames, the image processing system having first and second processors, and a shared memory accessible by the first and second processors for storing data representing frames of the image, the method comprising the steps of:

a) employing said first processor to load frames of the image from a storage device in to the shared memory, for each frame the loading process comprising the steps of:

i) retrieving from the storage device data representing the frame;

ii) loading the frame data into the shared memory; and iii) storing in the shared memory frame address information identifying the location within shared memory of the frame data and the positional relationship of the frame to other frames of the image;

b) employing the second processor to display portions of the image on a display device; and c) storing in the shared memory positional information entered by a user via an input device connectable to the image processing system;

at step (a), said first processor accessing the positional information to determine in what order to load the frames of the image in to shared memory; and at step (b) said second processor accessing the positional information to determine a portion of the image to be displayed, and referencing the frame address information in order to retrieve the corresponding image data from the shared memory for display of that portion on the display device.

10. A method as claimed in claim 9, wherein the first processor comprises a number of processors arranged to load frames of the image in to the shared memory.

11. A method as claimed in claim 10, wherein the positional information stored in the shared memory includes directional information for determining which direction the user wishes to move through the image.

12. A method as claimed in claim 9, wherein the positional information stored in the shared memory includes directional information for determining which direction the user wishes to move through the image.

13. A method as claimed in claim 9, further comprising the step of:

d) applying predetermined criteria to select frames which can be discarded from the shared memory so as to ensure that space is available in the shared memory for frames subsequently loaded by the first processor.

14. A method as claimed in claim 13, wherein, in the step (d), the positional information stored in the shared memory is used to select discardable frames that are farthest spatially from the current user position.

* * * * *